INVENTORS
Edward A. Petrocelli &
Hung Chang Lin.

ns to an intermediate frequency. The output of the
United States Patent Office 3,408,575
Patented Oct. 29, 1968

3,408,575
RECEIVING APPARATUS USING HALL EFFECT FEEDBACK CONTROL
Edward A. Petrocelli, Daytona Beach, Fla., and Hung Chang Lin, Silver Spring, Md., assignors to Westinghouse Electric Corporation, Pittsburgh, Pa., a corporation of Pennsylvania
Filed Apr. 23, 1965, Ser. No. 450,412
5 Claims. (Cl. 325—411)

ABSTRACT OF THE DISCLOSURE

A Hall effect device is disposed in the magnetic field of an audio output transducer with its current coil connected in the output of the amplifier, thereby generating an output proportional to the product of the current and the magnetic field, which output is negatively fed back to the input of the amplifier.

---

The present invention relates to signal receiving apparatus, and more particularly to signal receiving apparatus having included therein feedback control.

In many situations, when an electroacoustical transducer, such as a loudspeaker, is utilized as the output device of a receiving system, it is desirable to generate a signal that is indicative of the acoustical output of the transducer for feedback purposes. Such a feedback signal would be an indication of the actual acoustical output of the system in contradistinction to a feedback proportional to the electrical driving signals applied to the transducer which are typically used for feedback control. Since electroacoustical transducers are non-linear devices, a signal directly related to the acoustical characteristics of the system is a definite advantage in providing accurate control of the sound output of the system.

It is therefore an object of the present invention to provide signal receiving apparatus utilizing a new and improved feedback control system.

It is a further object of the present invention to provide radio receiving apparatus utilizing a new and improved feedback control system includnig a Hall generator device.

Broadly, the present invention provides signal receiving apparatus in which a Hall generator device is disposed in the associated magnetic field of an output transducer of the receiver. The Hall generator device is also driven by the output of an amplifier device of the receiver and is operative to feedback to the input of the amplifier, a feedback control signal which is proportional to the product of the magnetic field and output of the amplifier device, thereby providing feedback control for the receiving apparatus.

Figure 1:
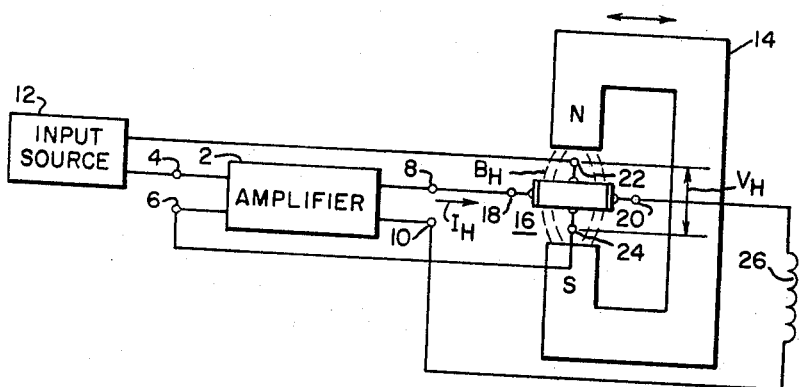
Figure 2:
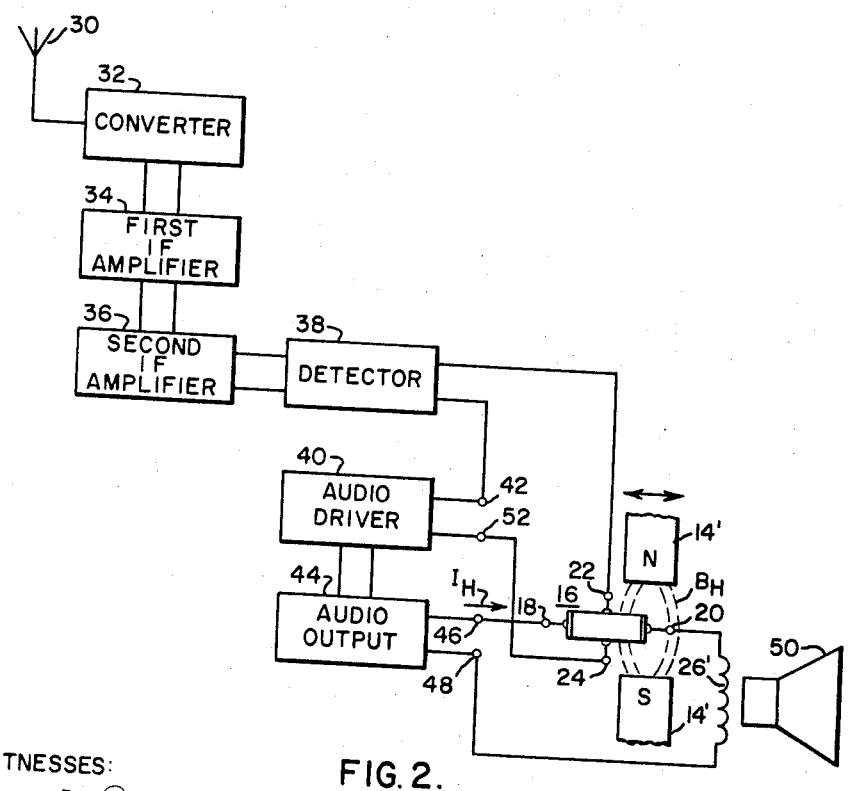

These and other objects and advantages of the present invention will become more apparent when considered in view of the following specification and drawings in which:

FIGURE 1 is a schematic-block diagram of the signal receiving apparatus of the present invention; and FIG. 2 is a block-schematic diagram of radio receiving apparatus incorporating the teachings of the present invention therein.

The Hall generator is a well known semiconductor device which operates on the Hall effect to generate a transverse voltage $V_H$ which is proportional to the product of the transverse current $I_H$ passed through the device and the magnitude of the magnetic field $B_H$ applied to the device, that is $V_H \alpha I_H B_H$. The voltage, current and magnetic field quantities being so interrelated, by varying one or more of them the variation may be detected in the other quantity. Thus, for example, by holding the Hall current substantially constant, variations in the applied magnetic field may be detected by measuring the Hall voltage generated in response to these variations.

Referring to FIGURE 1, signal receiving apparatus is shown including an amplifier 2 having a pair of input terminals 4 and 6 and a pair of output terminals 8 and 10. An input source 12 is provided to supply input signals to the input terminal 4 of the amplifier 2. The input source may supply any type of signal whose amplitude varies, for example, radio frequency signals amplitude modulated. A magnetic circuit including a member 14 is provided having an air gap with a pair of magnetic poles N and S, as shown. The magnetic member 14 supplies a magnetic field between the poles N and S, and may comprise a permanent magnet. The magnetic member 14 may form part of a transducer of the receiving apparatus and is operative to move in a lateral direction as shown by the arrow of FIGURE 1. The movement of the magnet would thus be a direct indication of the output of the transducer.

A Hall generator device 16 is disposed so that a portion thereof is placed within the air gap of the magnetic member 14. The Hall generator device 16 comprises a pair of current terminals 18 and 20 and a pair of voltage terminals 22 and 24. A magnetic field $B_H$ is thus applied to the Hall generator device 16 which varies with the lateral movement of the magnetic member 14.

The output terminal 8 is connected to the current terminal 18, and the other current terminal 20 is connected through a load impedance 26 to the other output terminal 10 of the amplifier 2. The load impedance 26 may comprise for instance the driving coil of an electrodynamic speaker. The lateral movement of the magnetic member 14 may be for example proportional to the magnitude of the input signals as would be the case when the magnetic member is driven by a driving coil of a loudspeaker. One of the voltage terminals 22 is connected to the input source 12. The other voltage terminal 24 is fed back to supply the other input terminals 6 of the amplifier 2.

With input signals being supplied to the amplifier 2 from the input source 12 at the input terminal 4, current $I_H$ will be supplied to the current terminals 18 and 20 of the Hall device 16, which will pass through device 16 and the load impedance 26 between the output terminals 8 and 10 of the amplifier 2. The magnetic field $B_H$ is supplied across the device from the magnetic member 14 proportional to the position of the device 16 with respect to the magnetic member 14. A Hall voltage $V_H$ will thus be generated across the voltage terminals 22 and 24 in proportion to the product of the current $I_H$ and the magnetic field $B_H$. The Hall current $I_H$ may be assumed to be substantially constant by controlling the gain of the amplifier, for example, by automatic volume control as is well known in the art. This voltage acts as a feedback control voltage and is fed back to the input of the amplifier 2 at the terminal 6 as a degenerative or negative feedback which will control the amplifier and provide the advantages of negative feedback control in response to the magnitude of this voltage as is well known in the art. Therefore, as the magnitude of the magnetic field $B_H$ increases, for example, due to any increased lateral movement of the magnetic member 14, the magnitude of the voltage $V_H$ fed back to the amplifier 2 will increase and so will control the output of the amplifier 2 in response to variations in the physical movement of the magnetic member 14.

In FIGURE 2, the teachings of the present invention are embodied into radio receiving apparatus. Incoming signals, which may be at radio frequencies and amplitude modulated are received at an antenna 30. These signals are applied to a converter circuit 32 which converts the signals to an intermediate frequency. The output of the converter 32 is applied to a first intermediate amplifier 34, whose output in turn is applied to a second intermediate amplifier 36. A detector 38 receives the intermediate frequency amplifier signals from the second amplifier 36 and detects the modulation contained therein. The output of the detector 38 is applied to an audio driver 40 at an input terminal 42. The output of the audio driver is then applied to an audio output stage 44. At an output terminal 46 of the audio output stage 44 current is supplied to the current terminals 18 and 20 of the Hall device 16. Connected between the current terminal 20 and the other output terminal 48 of the audio output stage 44 is a driving coil 26' which acts as a load impedance for the output circuit of the audio output stage 44 and also the driving coil for the loudspeaker 50. The loudspeaker 50 has an associated driving magnet 14', which includes an air gap with north and south poles N and S. The driving magnet 14' is driven in a direction shown by the arrow by the driving coil 26' in a manner well known with respect to loudspeakers. The Hall generator device 16 is disposed within the air gap and thus will have applied thereto a variable magnetic field $B_H$ depending upon the amount of variation of vibration of the magnet 14'. The Hall generator 16 could also be disposed in other manners so as to be in the magnetic field of speaker 50. For example, it could be fixed to the core of the speaker.

To provide degenerative feedback to the audio driver stage, the voltage terminal 22 is connected to one of the outputs of the detectors 38, and the other voltage terminal 24 is connected to the input terminal 52 of the audio driver 40. Thus, the Hall voltage appearing across the terminals 22 and 24 is applied as degenerative or neagtive feedback to the input of the audio driver amplifier 40. This voltage is proportional to the product of current passing through the device and the magnitude of the applied magnetic field supplied by the driver magnet 14'. Thus, as the magnitude of magnetic field increases, the magnitude of the feedback voltage applied to the input of the audio driver 40 increases to thereby control the audio driver in proportion thereto.

It should be noted that various other feedback arrangements could be utilized rather than those shown in FIGURE 2. For example, the Hall voltage from the Hall generator could be fed back to the last audio amplifying stage rather than the first as shown therein. Also various types of amplifiers could be utilized including both vacuum tube and transistor types. The type of input signals received, of course, is not limited to amplitude modulated ones, but could include various other types.

Althought the present invention has been described with a certain degree of particularity, it should be understood that the present disclosure has been made only by way of example and that numerous changes in the details of construction and the combination of arrangement of parts, elements and devices may be resorted to without departing from the scope and the spirit of the present invention.

We claim as our invention:

1. In signal receiving apparatus operative with a source of input signals the combination of: amplifying means; a Hall generator device having current and voltage terminals and providing an output voltage across said voltage terminals proportional to the product of the current passing through said current terminals and the magnetic field applied thereto; a transducer having a magnetic field associated therewith, said Hall generator device having at least a portion thereof disposed within said magnetic field, said current terminals of said device being operatively connected between the output of said amplifying means and said transducer, and said voltage terminals of said Hall generator device being operatively connceted between said source of input signals and the input of said amplifying means so that degenerative feedback is provided to said amplifying means to provide feedback control in response to the output voltage generated by said Hall generator device.

2. The combination of claim 1, said transducer including a movable magnetic member driven by the output of said amplifying means and producing said magnetic field said magnetic member being movable with respect to said Hall generator device.

3. A signal receiver operative with a source of input signals and having automatic volume control comprising, a plurality of amplifying stages for amplifying the input signals, a Hall generator device having current and voltage terminals and providing an output voltage across said voltage terminals proportional to the product of the current through said current terminals and the magnetic field applied thereto, a transducer including a driving coil and a movable magnetic member driven by said coil and producing a magnetic field, said Hall device having at least a portion thereof disposed within the magnetic field of said magnetic member with the magnetic member being movable with respect to said Hall generator device, the current terminals of said Hall generator device being connected between the output of the last stages of said amplifying stages and said driving coil of said transducer, and said voltage terminals of said Hall generator device being connected between said source and the input of one of said stages of said amplifying stages so that degenerative feedback is provided thereto to provide feedback control in response to the output voltage generated by said Hall generator device across said voltage terminals.

4. In signal receiving apparatus operative with a source of amplitude varying signals and having automatic volume control comprising, amplifying means for receiving and amplifying the signals from said source, a Hall generator device having current and voltage terminals and providing an output voltage across said voltage terminals proportional to the product of the current through said current terminals and the magnetic field applied thereto, a loudspeaker including a driving coil and a movable magnetic member driven by said coil and producing a magnetic field, said Hall device having at least a portion thereof disposed within the magnetic field of said magnetic member with the magnetic member being movable with respect to said Hall generator device, the current terminals of said Hall generator device being connected between the output of said amplifying means and said driving coil of said loudspeaker, and said voltage terminals of said Hall generator device being connected between said source and the input of said amplifying means so that degenerative feedback is provided thereto to provide feedback control in response to the output voltage generated by said Hall generator device across said voltage terminals.

5. A radio receiver for receiving radio frequency signals and having automatic volume control comprising, conversion means for receiving radio frequency signals and converting these to intermediate frequency signals, intermediate frequency amplifying means for amplifying the intermediate frequency signals, detector means for detecting audio information in the amplified intermediate frequency signals, audio amplifying means, a Hall generator device having current and voltage terminals and providing an output voltage across said voltage terminals proportional to the product of the current through said current terminals and the magnetic field applied thereto, a loudspeaker including a driving coil and a movable magnetic member driven by said coil and producing a magnetic field, said Hall device having at least a portion magneitc thereof disposed within the magnetic field of said magnetic member with the magnetic member being movable with respect to said Hall generator device, the current terminals of said Hall generator device being connected between the output of said audio amplifying means and said driving coil of said loudspeaker, and said voltage terminals of said Hall generator device being connected between the output of said detector means and the input of said audio amplifying means to that degenerative feedback is provided thereto to provide feedback control in response to the output voltage generated by said Hall generator device across said voltage terminals.

References Cited

UNITED STATES PATENTS

| | | | |
|---|---|---|---|
| 3,066,187 | 11/1962 | Taylor et al. | 179—1 |
| 3,178,696 | 4/1965 | Clafin | 307—88.5 |
| 3,009,991 | 11/1961 | Bekey | 179—1 |
| 2,988,650 | 6/1961 | Weiss | 307—88.5 |
| 2,948,778 | 8/1960 | Clements | 179—1 |
| 2,538,772 | 1/1951 | Ferrill | 325—408 |

KATHLEEN H. CLAFFY, *Primary Examiner.*

R. P. TAYLOR, *Assistant Examiner.*